United States Patent
Yoshida et al.

(10) Patent No.: US 9,784,155 B2
(45) Date of Patent: Oct. 10, 2017

(54) EXHAUST PURIFICATION SYSTEM FOR INTERNAL COMBUSTION ENGINE

(71) Applicants: Kohei Yoshida, Gotenba (JP); Yoshiteru Yazawa, Nagoya (JP)

(72) Inventors: Kohei Yoshida, Gotenba (JP); Yoshiteru Yazawa, Nagoya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 94 days.

(21) Appl. No.: 14/782,775

(22) PCT Filed: Apr. 9, 2013

(86) PCT No.: PCT/JP2013/060738
§ 371 (c)(1),
(2) Date: Oct. 6, 2015

(87) PCT Pub. No.: WO2014/167650
PCT Pub. Date: Oct. 16, 2014

(65) Prior Publication Data
US 2016/0069234 A1    Mar. 10, 2016

(51) Int. Cl.
*F01N 3/025* (2006.01)
*F01N 3/08* (2006.01)
*F01N 9/00* (2006.01)

(52) U.S. Cl.
CPC ......... *F01N 3/0253* (2013.01); *F01N 3/0814* (2013.01); *F01N 3/0842* (2013.01);
(Continued)

(58) Field of Classification Search
CPC .... F01N 3/0253; F01N 3/0814; F01N 3/0842; F01N 9/00; F01N 9/002; F01N 2240/18;
(Continued)

(56) References Cited

U.S. PATENT DOCUMENTS

| 2002/0049373 A1 | 4/2002 | Miwa |
| 2012/0131908 A1 | 5/2012 | Bisaiji et al. |

(Continued)

FOREIGN PATENT DOCUMENTS

| JP | 2002-034927 | 2/2002 |
| JP | 2002-349237 | 12/2002 |

(Continued)

OTHER PUBLICATIONS

U.S. Appl. No. 14/117,549, filed Apr. 9, 2013.

*Primary Examiner* — Audrey K Bradley
(74) *Attorney, Agent, or Firm* — Finnegan, Henderson, Farabow, Garrett & Dunner, LLP

(57) ABSTRACT

In an internal combustion engine, an exhaust purification catalyst (13), hydrocarbon feed valve (15) and particulate filter (14) are arranged in an exhaust passage. If temperature increasing control should be performed when a first $NO_X$ purification method is performed, injection of hydrocarbons for the first $NO_X$ purification method is performed with a predetermined period and injection of hydrocarbons for temperature increasing control is performed in a time period when injection of hydrocarbons for the first $NO_X$ purification method is not performed, the first $NO_X$ purification method being configured to purify $NO_X$ which is contained in the exhaust gas by injecting hydrocarbons from the hydrocarbon feed valve with the predetermined period, the temperature increasing control being configured to increase a temperature of the particulate filter to remove particulate matters trapped on the particulate filter. An amount of injection of hydrocarbons for temperature increasing control when an actual temperature of the particulate filter is low is set larger than that when the actual temperature of the particulate filter is high.

6 Claims, 15 Drawing Sheets

(52) U.S. Cl.
CPC ............... *F01N 9/00* (2013.01); *F01N 9/002*
(2013.01); *F01N 2240/18* (2013.01); *F01N
2610/03* (2013.01); *F01N 2900/1602*
(2013.01); *Y02T 10/47* (2013.01)

(58) Field of Classification Search
CPC ......... F01N 2610/03; F01N 2900/1602; Y02T
10/47
See application file for complete search history.

(56) References Cited

U.S. PATENT DOCUMENTS

| | | |
|---|---|---|
| 2013/0047588 A1 | 2/2013 | Inoue et al. |
| 2013/0149198 A1 | 6/2013 | Umemoto et al. |
| 2013/0192212 A1 | 8/2013 | Umemoto et al. |
| 2013/0315790 A1* | 11/2013 | Bisaiji .................. F01N 3/0842 422/171 |

FOREIGN PATENT DOCUMENTS

| | | | |
|---|---|---|---|
| JP | 2005-016394 | 1/2005 | |
| JP | 2005-16394 | 1/2005 | |
| JP | 2009-257209 | 11/2009 | |
| JP | 2012-026406 | 2/2012 | |
| WO | WO 2011/114499 | 9/2011 | |
| WO | WO 2012/029189 | 3/2012 | |
| WO | WO 2012/029190 | 3/2012 | |
| WO | WO 2012108059 A1 * | 8/2012 | ........... F01N 3/0842 |
| WO | WO 2013/031028 | 3/2013 | |

\* cited by examiner

EXHAUST PURIFICATION SYSTEM FOR INTERNAL COMBUSTION ENGINE

TECHNICAL FIELD

The present invention relates to an exhaust purification system for an internal combustion engine.

BACKGROUND ART

An internal combustion engine is known in the art, in which an exhaust purification catalyst is arranged in an engine exhaust passage and a hydrocarbon feed valve is arranged upstream of the exhaust purification catalyst in the engine exhaust passage, a precious metal catalyst is carried on an exhaust gas flow surface of the exhaust purification catalyst and basic exhaust gas flow surface parts are formed around the precious metal catalyst, wherein the exhaust purification catalyst has the property of reducing $NO_X$ which is contained in exhaust gas if a concentration of hydrocarbons which flow into the exhaust purification catalyst is made to vibrate at an amplitude within a predetermined range of amplitude and with a period within a predetermined range of period and has the property of a storage amount of $NO_X$ which is contained in exhaust gas increasing if a vibration period of the hydrocarbon concentration is made longer than this predetermined range, and wherein a first $NO_X$ purification method is performed, the first $NO_X$ purification method being configured to purify $NO_x$ which is contained in the exhaust gas by injecting hydrocarbons from the hydrocarbon feed valve with a period within the predetermined range of period (for example, see PTL 1). In this internal combustion engine, further, a particulate filter for trapping particulate matters in the exhaust gas is arranged inside the engine exhaust passage downstream of the exhaust purification catalyst.

On the other hand, an internal combustion engine is also known in the art, in which a temperature increasing control, configured to increase a temperature of the particulate filter under a lean air-fuel ratio in order to oxidize and remove particulate matters trapped on the particulate filter, is performed. In the internal combustion engine which is described in PTL 1, temperature increasing control can be performed by injecting hydrocarbons from the hydrocarbon feed value so that an air-fuel ratio of the exhaust gas which flows into the particulate filter is made lean.

CITATIONS LIST

Patent Literature

PTL 1: WO2011/114499A

SUMMARY OF INVENTION

Technical Problem

In this regard, to reliably perform the first $NO_X$ purification method, it is necessary to make the concentration of hydrocarbons which flow into the exhaust purification catalyst vibrate well. For this, it is necessary to inject the hydrocarbons for the first $NO_X$ purification method at a relatively high injection pressure from the hydrocarbon feed valve.

On the other hand, the above-mentioned temperature increasing control is performed, for example, when an amount of particulate matters trapped on the particulate filter exceeds an allowable upper limit amount. For this reason, if the trapped amount of particulate matters exceeds the allowable upper limit amount when the first $NO_X$ purification method is being performed, it is necessary to perform temperature increasing control while performing the first $NO_X$ purification method.

In this case; however, if injecting the hydrocarbons for temperature increasing control in addition to the hydrocarbons for the first $NO_X$ purification method, a large amount of hydrocarbons would be injected to the exhaust purification catalyst at a high injection pressure. As a result, part of the hydrocarbons may slip through the exhaust purification catalyst and therefore the first $NO_X$ purification method is liable to be unable to be performed effectively. Further, the hydrocarbons injected from the hydrocarbon feed valve are difficult to diffuse in a radial direction of the exhaust purification catalyst or particulate filter, so the temperature of the particulate filter is liable to become uneven. In this case, the particulate matters on the particulate filter may not be reliably removed or an excessively large heat stress is liable to act on the particulate filter.

In this way, it is not easy to simultaneously perform the first $NO_X$ purification method and temperature increasing control. PTL 1 does not allude to this point at all.

An object of the present invention is to provide an exhaust purification system for an internal combustion engine which enables $NO_X$ to be purified well while enabling good temperature increasing control.

Solution to Problem

According to the present invention, there is provided an exhaust purification system for an internal combustion engine, in which an exhaust purification catalyst is arranged in an engine exhaust passage and a hydrocarbon feed valve is arranged upstream of the exhaust purification catalyst in the engine exhaust passage, a precious metal catalyst is carried on an exhaust gas flow surface of the exhaust purification catalyst and basic exhaust gas flow surface parts are formed around the precious metal catalyst, wherein the exhaust purification catalyst has the property of reducing $NO_X$ which is contained in exhaust gas if a concentration of hydrocarbons which flow into the exhaust purification catalyst is made to vibrate at an amplitude within a predetermined range of amplitude and with a period within a predetermined range of period and has the property of a storage amount of $NO_X$ which is contained in exhaust gas increasing if a vibration period of the hydrocarbon concentration is made longer than the predetermined range of period, wherein a first $NO_X$ purification method is performed, the first $NO_X$ purification method being configured to purify $NO_x$ which is contained in the exhaust gas by injecting hydrocarbons from the hydrocarbon feed valve with a period within the predetermined range of period, wherein a particulate filter for trapping particulate matters in the exhaust gas is further arranged in the engine exhaust passage, wherein, if temperature increasing control should be performed when the first $NO_X$ purification method is being performed, injection of hydrocarbons for the first $NO_X$ purification method is performed with the period within the predetermined range of period and injection of hydrocarbons for temperature increasing control is performed in a time period when injection of hydrocarbons for the first $NO_X$ purification method is not performed, the temperature increasing control being configured to increase a temperature of the particulate filter to remove particulate matters trapped on the particulate filter, and wherein an amount of injection of hydrocarbons for temperature increasing control when an actual temperature of the particulate filter is low is set larger than that when the actual temperature of the particulate filter is high.

Advantageous Effects of Invention

It is possible to purify $NO_X$ well while performing good temperature increasing control.

DESCRIPTION OF EMBODIMENTS

Figure 1:
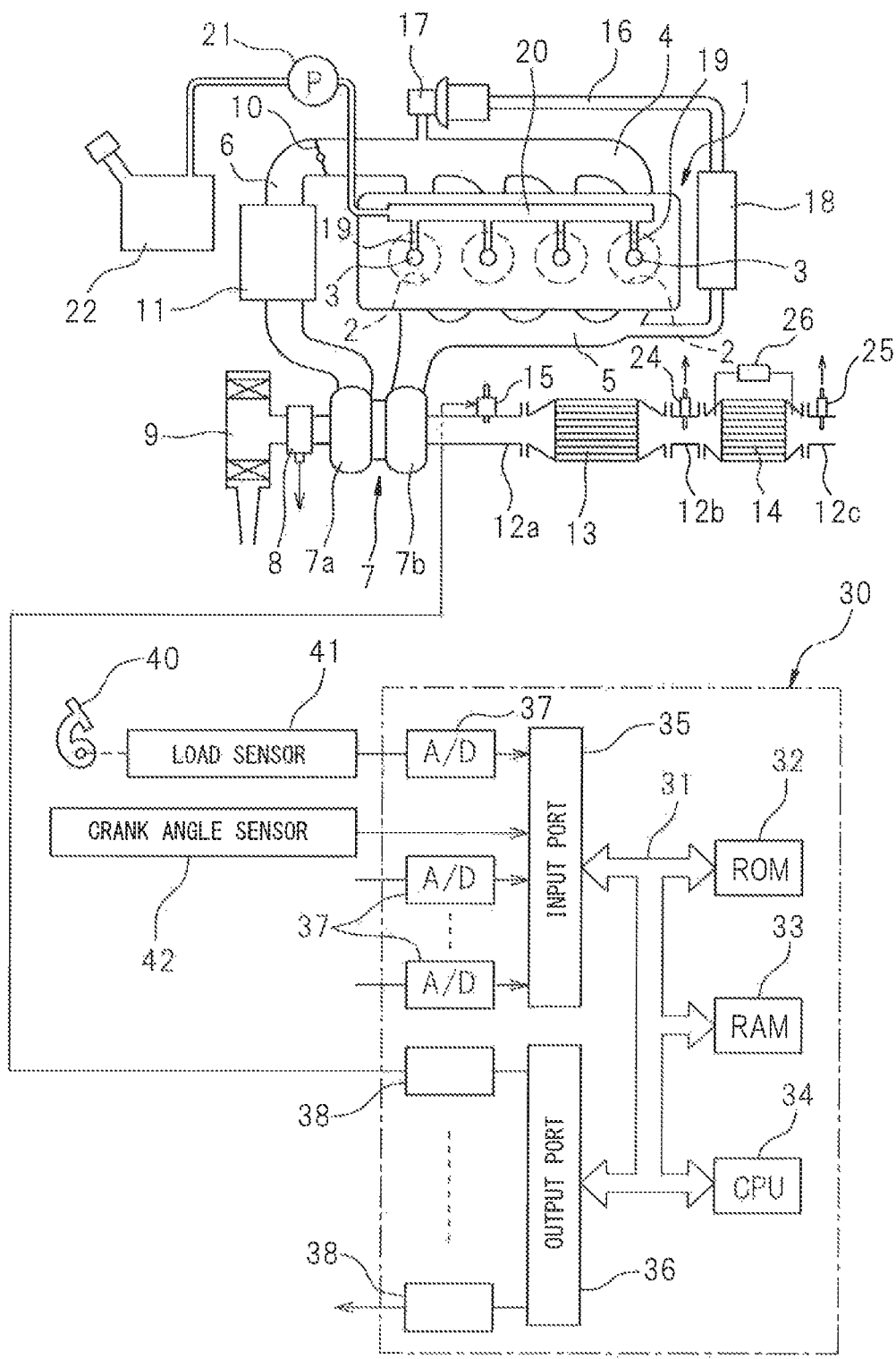
FIG. 1 is an overall view of a compression ignition type of internal combustion engine.

FIG. 1 is an overall view of a compression ignition type internal combustion engine. Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air detector 8 to an air cleaner 9. Inside the intake duct 6, a throttle valve 10 which is driven by an actuator is arranged. Around the intake duct 6, a cooling device 11 is arranged for cooling an intake air which flows through the inside of the intake duct 6. In the embodiment which is shown in FIG. 1, an engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. An outlet of the exhaust turbine 7b is connected through an exhaust pipe 12a to an inlet of an exhaust purification catalyst 13. In the embodiment according to the present invention, this exhaust purification catalyst 13 is comprised of an $NO_X$ storage catalyst. An outlet of the exhaust purification catalyst 13 is connected through an exhaust pipe 12 to a particulate filter 14. In another embodiment, a particulate filter 14 is arranged upstream of the exhaust purification catalyst 13. Upstream of the exhaust purification catalyst 13 inside the exhaust pipe 12a, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which combustion is carried out under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, around the EGR passage 16, a cooling device 18 is arranged for cooling an EGR gas which flows through the inside of the EGR passage 16. In the embodiment which is shown in FIG. 1, the engine cooling water is guided to the inside of the cooling device 18 where the engine cooling water is used to cool the EGR gas. Each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 21 is fed through each fuel feed tube 19 to the fuel injector 3.

An electronic control unit 30 is comprised of a digital computer provided with components connected with each other by a bidirectional bus 31 such as a ROM (read only memory) 32, a RAM (random access memory) 33, a CPU (microprocessor) 34, an input port 35, and an output port 36. Downstream of the exhaust purification catalyst 13 in the exhaust pipe 12b, a temperature sensor 24 is arranged for detecting a temperature of an exhaust gas which flows out from the exhaust purification catalyst 13. The temperature of the exhaust gas which is detected by the temperature sensor 24 expresses a temperature of the exhaust purification catalyst 13. Further, downstream of the particulate filter 14 in the exhaust pipe 12c, a temperature sensor 25 for detecting a temperature of an exhaust gas which flows out from the particulate filter 14 is attached. The temperature of the exhaust gas which is detected by the temperature sensor 25 expresses a temperature of the particulate filter 14. Further, a differential pressure sensor 26 is attached to the particulate filter 14 for detecting a differential pressure across the particulate filter 14. Output signals of these temperature sensors 24 and 25, differential pressure sensor 26, and intake air detector 8 are input through respectively corresponding AD converters 37 to the input port 35. Further, a load sensor 41 is connected to an accelerator pedal 40, which generates an output voltage proportional to the amount of depression L of the accelerator pedal 40. An output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, the actuator for driving the throttle valve 10, hydrocarbon feed valve 15, EGR control valve 17, and fuel pump 21.

Figure 2:
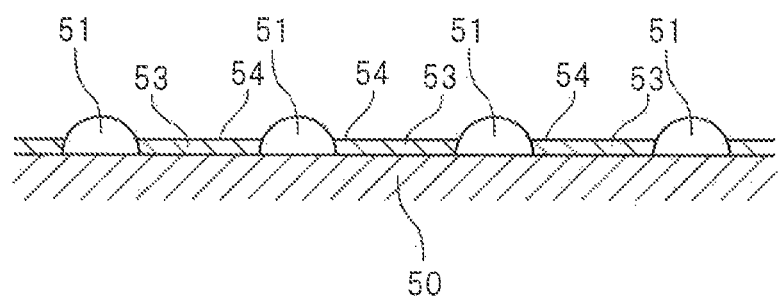
FIG. 2 is a view schematically showing a surface part of a catalyst carrier.

FIG. 2 schematically shows a surface part of a catalyst carrier which is carried on a substrate of the exhaust purification catalyst 13 which is shown in FIG. 1. In this exhaust purification catalyst 13, as shown in FIG. 2, a precious metal catalyst 51 is carried on a catalyst carrier 50 made of, for example, alumina. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanide or another such rare earth and silver Ag, copper Cu, iron Fe, iridium Ir, or another metal able to donate electrons to $NO_X$. This basic layer 53 is made to contain ceria $CeO_2$. Therefore, the exhaust purification catalyst 13 has an oxygen storage ability. Further, the catalyst carrier 50 of the exhaust purification catalyst 13 can carry not only platinum Pt, but only rhodium Rh or palladium Pd. Note that the exhaust gas flows along the top of the catalyst carrier 50, so the precious metal catalyst 51 can be said to be carried on an exhaust gas flow surface of the exhaust purification catalyst 13. Further, a surface of the basic layer 53 exhibits basicity, so the surface of the basic layer 53 is referred to as a "basic exhaust gas flow surface parts 54".

Figure 3:
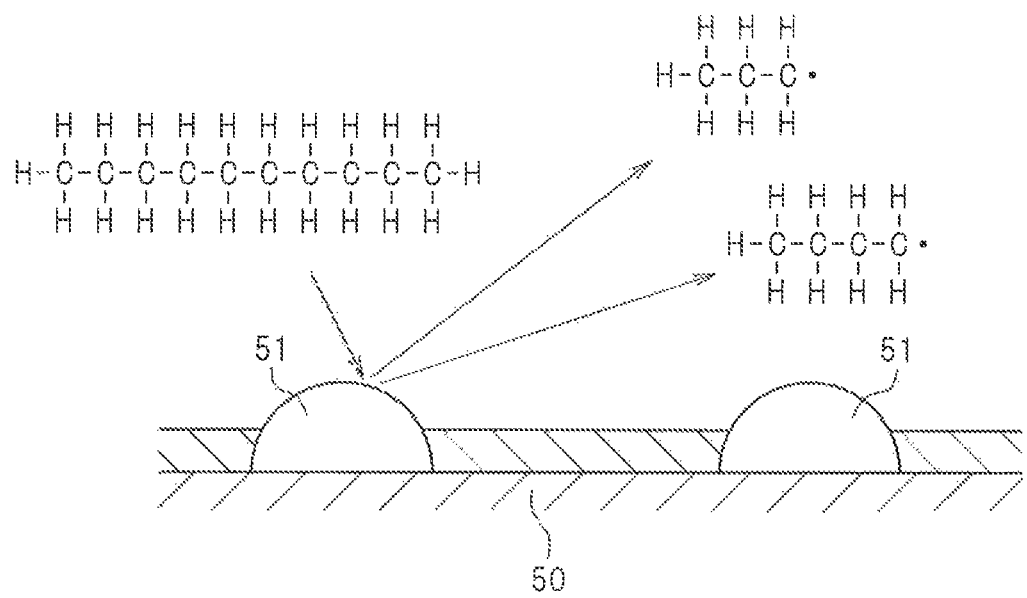
FIG. 3 is a view for explaining an oxidation reaction in an exhaust purification catalyst.

If hydrocarbons are injected from the hydrocarbon feed valve 15 into the exhaust gas, the hydrocarbons are reformed by the exhaust purification catalyst 13. In the present invention, the reformed hydrocarbons at this time are used to purify the $NO_X$ at the exhaust purification catalyst 13. FIG. 3 schematically shows a reformation action performed at the exhaust purification catalyst 13 at this time. As shown in FIG. 3, the hydrocarbons HC which are injected from the hydrocarbon feed valve 15 are converted to radical hydrocarbons HC with less carbon atoms due to the precious metal catalyst 51.

Figure 4:
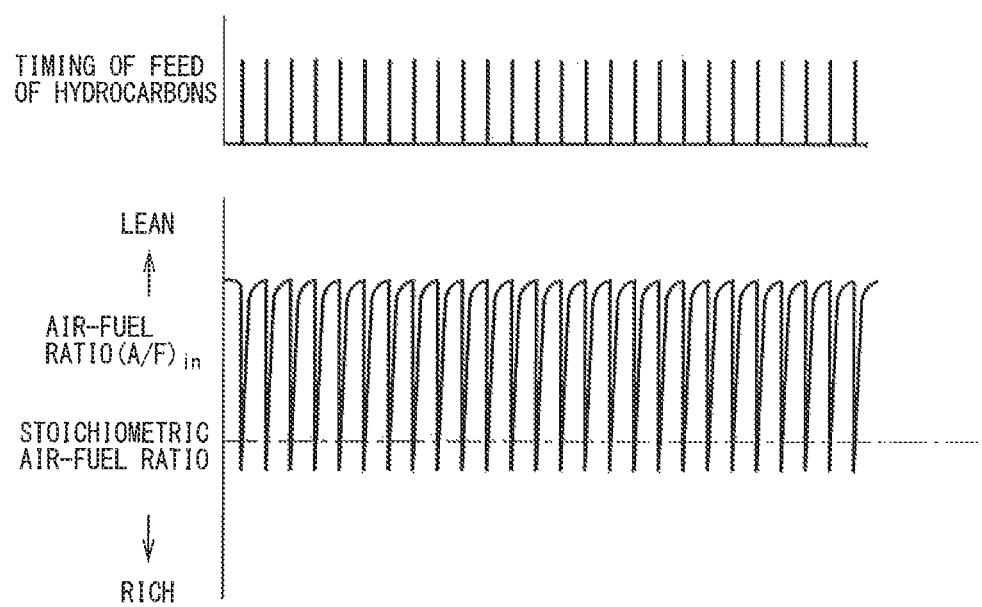
FIG. 4 is a view which shows a change of an air-fuel ratio of exhaust gas which flows into an exhaust purification catalyst.

FIG. 4 shows a feed timing of hydrocarbons from the hydrocarbon feed valve 15 and a change in an air-fuel ratio (A/F) in of the exhaust gas which flows into the exhaust purification catalyst 13. Note that the change in the air-fuel ratio (A/F) in depends on a change in concentration of the hydrocarbons in the exhaust gas which flows into the exhaust purification catalyst 13, so it can be said that the change in the air-fuel ratio (A/F) in shown in FIG. 4 expresses the change in concentration of the hydrocarbons. However, if the hydrocarbon concentration becomes higher, the air-fuel ratio (A/F) in becomes smaller, so, in FIG. 4, the more to the rich side the air-fuel ratio (A/F) in becomes, the higher the hydrocarbon concentration.

Figure 5:
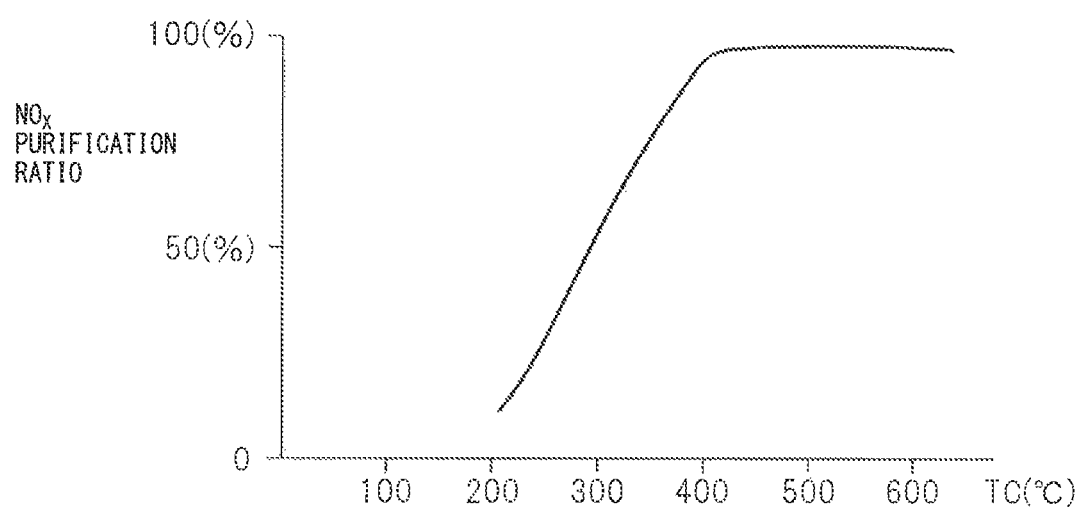
FIG. 5 is a view which shows an $NO_X$ purification ratio.

FIG. 5 shows an $NO_X$ purification ratio by the exhaust purification catalyst 13 with respect to a catalyst temperatures TC of the exhaust purification catalyst 13 when making the concentration of hydrocarbons which flow into the exhaust purification catalyst 13 change periodically so as to, as shown in FIG. 4, make the air-fuel ratio (A/F) in of the exhaust gas flowing to the exhaust purification catalyst 13 change periodically. As a result of extensive research relating to $NO_X$ purification for a long time, it has been found that if making the concentration of hydrocarbons which flow into the exhaust purification catalyst 13 "vibrate" at an amplitude within a predetermined range of amplitude and with a period within a predetermined range of period, as shown in FIG. 5, an extremely high $NO_X$ purification ratio is obtained even in a high temperature region in which the temperature is 400° C. or higher.

Figure 6A:
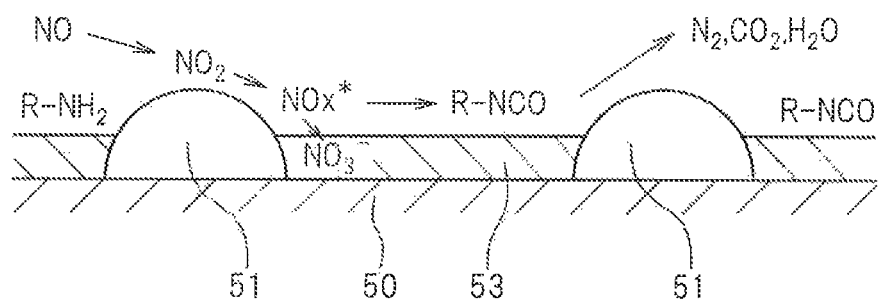
FIG. 6A and FIG. 6B are views for explaining an oxidation and reduction reaction in an exhaust purification catalyst.
Figure 6B:
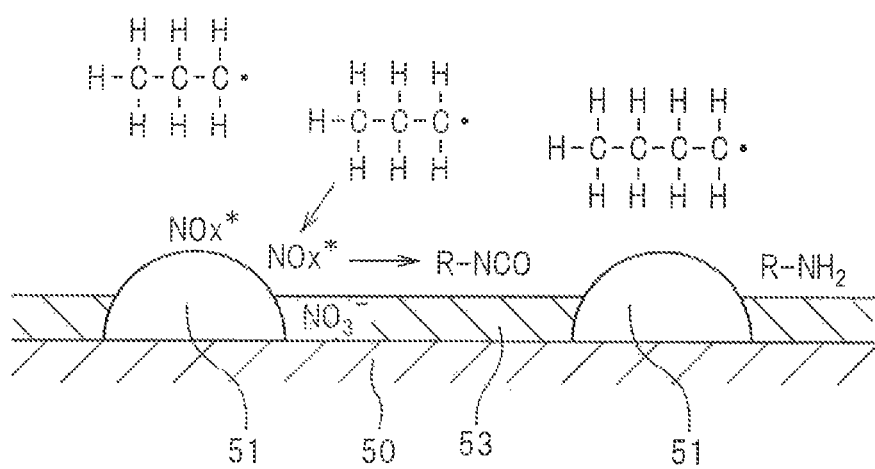

Furthermore, it has been found that, at this time, a large amount of reducible intermediates including nitrogen and hydrocarbons continues to be held or adsorbed on the surface of the basic layer 53, that is, on the basic exhaust gas flow surface parts 54 of the exhaust purification catalyst 13, and that the reducible intermediates play a central role in obtaining a high $NO_X$ purification ratio. Next, this will be explained with reference to FIGS. 6A and 6B. Note that these FIGS. 6A and 6B schematically show the surface part of the catalyst carrier 50 of the exhaust purification catalyst 13. These FIGS. 6A and 6B show reactions presumed to occur when the concentration of hydrocarbons which flow into the exhaust purification catalyst 13 is made to vibrate at an amplitude within a predetermined range of amplitude and with a period within a predetermined range of period.

FIG. 6A shows a case when the concentration of hydrocarbons which flow into the exhaust purification catalyst 13 is low, while FIG. 6B shows a case when hydrocarbons are fed from the hydrocarbon feed valve 15 and the air-fuel ratio (A/F) in of the exhaust gas which flows into the exhaust purification catalyst 13 is made rich, that is, the concentration of hydrocarbons which flow into the exhaust purification catalyst 13 is made higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 is normally in a state of oxygen excess. At this time, part of the NO which is contained in the exhaust gas adheres to the exhaust purification catalyst 13, while part of the NO which is contained in the exhaust gas, as shown in FIG. 6A, is oxidized on the platinum 51 and is converted to $NO_2$. Next, this $NO_2$ is further oxidized and is converted to $NO_3$. Further, part of the $NO_2$ is converted to $NO_2^-$. Therefore, on the platinum Pt 51, $NO_2^-$ and $NO_3$ are produced. The NO which adheres to the exhaust purification catalyst 13 and the $NO_2^-$ and $NO_3$ which are formed on the platinum Pt 51 are strong in activity. Therefore, these NO, $NO_2^-$, and $NO_3$ will be referred to as "active $NO_X^*$", hereinafter.

On the other hand, if hydrocarbons are fed from the hydrocarbon feed valve 15 and the air-fuel ratio (A/F) in of the exhaust gas which flows into the exhaust purification catalyst 13 is made rich, the hydrocarbons successively adhere over the entire exhaust purification catalyst 13. The majority of the adhering hydrocarbons successively react with oxygen and are burned. Part of the adhering hydrocarbons are successively reformed and radicalized in the exhaust purification catalyst 13 as shown in FIG. 3. Therefore, as shown in FIG. 6B, the hydrogen concentration around the active $NO_X^*$ becomes higher. In this regard, if, after the active $NO_X^*$ is produced, the state of a high oxygen concentration around the active $NO_X^*$ continues for a constant time or more, the active $NO_X^*$ is oxidized and is absorbed in the form of nitrate ions $NO_3^-$ inside the basic layer 53. However, if, before this constant time elapses, the hydrocarbon concentration around the active $NO_X^*$ is higher, the active $NO_X^*$ reacts on the platinum 51 with the radical hydrocarbons HC as shown in FIG. 6B to thereby form the reducible intermediates. The reducible intermediates adhere to or are adsorbed on the surface of the basic layer 53.

Note that, at this time, the first produced reducible intermediate is considered to be a nitro compound $R-NO_2$. Once a nitro compound $R-NO_2$ is produced, it is converted to a nitrile compound R—CN, but this nitrile compound R—CN can only survive for an instant in this state, so it is immediately converted to an isocyanate compound R—NCO. This isocyanate compound R—NCO is converted to an amine compound $R-NH_2$ if hydrolyzed. However, in this case, what is hydrolyzed is considered to be part of the isocyanate compound R—NCO. Therefore, the majority of the reducible intermediates which are held or adsorbed on the surface of the basic layer 53 as shown in FIG. 6B is believed to be the isocyanate compound R—NCO and amine compound $R-NH_2$.

On the other hand, if the hydrocarbons HC adhere around the produced reducible intermediates as shown in FIG. 6B, the reducible intermediates are blocked by the hydrocarbons HC and the reaction will not proceed any further. In this case, if the concentration of hydrocarbons which flow into the exhaust purification catalyst 13 is lowered and then the hydrocarbons which adhere around the reducible intermediates are oxidized and consumed and thereby the concentration of oxygen around the reducible intermediates becomes higher, the reducible intermediates react with the $NO_X$ in the exhaust gas or the active $NO_X^*$, react with the surrounding oxygen, or break down on their own. Due to these, the reducible intermediates R—NCO and $R-NH_2$ are converted to $N_2$, $CO_2$, and $H_2O$, as shown in FIG. 6A, and therefore the $NO_X$ is purified.

In this way, in the exhaust purification catalyst 13, reducible intermediates are produced by making the concentration of hydrocarbons which flow into the exhaust purification catalyst 13 higher. When oxygen concentration increases after the concentration of hydrocarbons which flow into the exhaust purification catalyst 13 is lowered, the reducible intermediates react with the $NO_X$ in the exhaust gas or the active $NO_X^*$ or oxygen or break down on their own, and thereby the $NO_X$ is purified. That is, in order for the exhaust purification catalyst 13 to purify the $NO_X$, the concentration of hydrocarbons which flow into the exhaust purification catalyst 13 has to be periodically changed.

Of course, in this case, it is necessary to increase the hydrocarbon concentration to a concentration sufficiently high for producing the reducible intermediates and it is necessary to lower the hydrocarbon concentration to a concentration sufficiently low for making the produced reducible intermediates react with the $NO_X$ in the exhaust gas or active $NO_X^*$ or oxygen or break down on their own. That is, it is necessary to make the concentration of hydrocarbons which flow into the exhaust purification catalyst 13 vibrate at an amplitude within a predetermined range of amplitude. Note that, in this case, it is necessary to hold the produced reducible intermediates on the basic layer 53, that is, the basic exhaust gas flow surface parts 54, until the reducible intermediates R—NCO and $R-NH_2$ react with the $NO_X$ in the exhaust gas or the active $NO_X^*$ or oxygen or break down themselves. For this reason, the basic exhaust gas flow surface parts 54 are provided.

On the other hand, if lengthening a feed period of the hydrocarbons, a time period during which the oxygen concentration is higher becomes longer, in a time period from when the hydrocarbons are fed to when the hydrocarbons are next fed. Therefore, the active $NO_X^*$ is absorbed in the basic layer 53 in the form of nitrates without producing reducible intermediates. To avoid this, it is necessary to make the concentration of hydrocarbons which flow into the exhaust purification catalyst 13 vibrate with a period within a predetermined range of period.

Therefore, in the embodiment of the present invention, to make an $NO_X$ which is contained in the exhaust gas and reformed hydrocarbons react with each other to produce reducible intermediates R—NCO and $R-NH_2$ including nitrogen and hydrocarbons, the precious metal catalyst 51 is carried on the exhaust gas flow surface of the exhaust purification catalyst 13. To hold the produced reducible intermediates R—NCO and $R-NH_2$ inside the exhaust purification catalyst 13, the basic exhaust gas flow surface parts 54 are formed around the precious metal catalyst 51. The reducible intermediates R—NCO and $R-NH_2$ which are held on the basic exhaust gas flow surface parts 54 are converted to $N_2$, $CO_2$, and $H_2O$. A vibration period of the hydrocarbon concentration is made a vibration period required for continuation of a production of the reducible intermediates R—NCO and $R-NH_2$. Incidentally, in the example shown in FIG. 4, an injection interval is made 3 seconds.

Figure 7A:
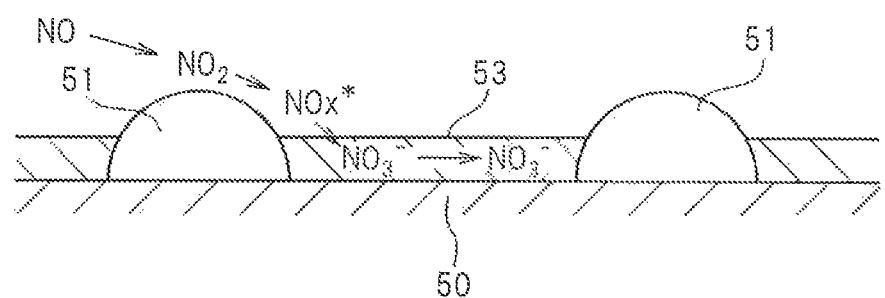
FIG. 7A and FIG. 7B are views for explaining an oxidation and reduction reaction in an exhaust purification catalyst.

If making a vibration period of the hydrocarbon concentration, that is, a vibration period of an injection of hydrocarbons HC from the hydrocarbon feed valve 15, longer than a period within the above-mentioned predetermined range of period, the reducible intermediate R—NCO or $R-NH_2$ is eliminated from the surface of the basic layer 53. At this time, the active $NO_X^*$ which is produced on the platinum Pt 53 diffuses in the form of nitric acid ions $NO_3^-$ inside the basic layer 53 and is converted to nitrates, as shown in FIG. 7A. That is, at this time, the $NO_X$ in the exhaust gas is absorbed in the form of nitrates inside the basic layer 53.

Figure 7B:
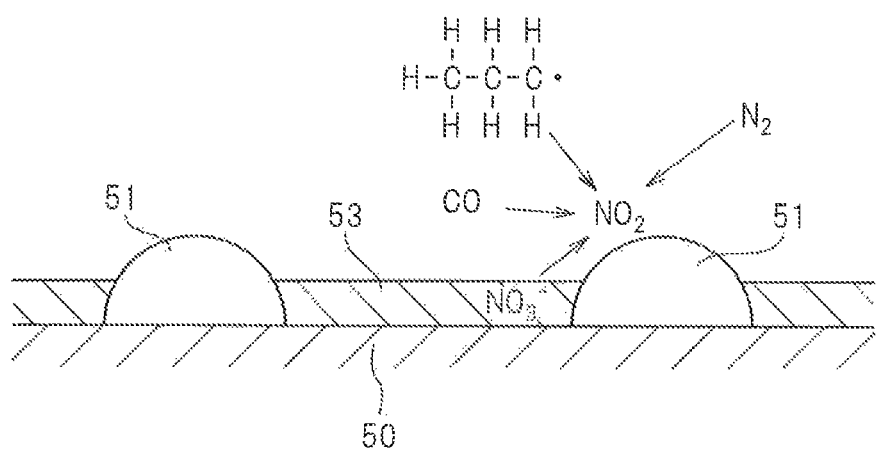

On the other hand, FIG. 7B shows a case where the air-fuel ratio of the exhaust gas which flows into the exhaust purification catalyst 13 is made the stoichiometric air-fuel ratio or rich when the $NO_X$ is absorbed in the form of nitrates inside the basic layer 53 in this way. In this case, the concentration of oxygen in the exhaust gas falls, so the reaction proceeds in the opposite direction ($NO_3^- \rightarrow NO_2$) and therefore the nitrates which are absorbed in the basic layer 53 successively are converted to nitric acid ions $NO_3^-$ and, as shown in FIG. 7B, are released in the form of $NO_2$ from the basic layer 53. The released $NO_2$ is then reduced by hydrocarbons HC and CO which are contained in the exhaust gas.

Figure 8:
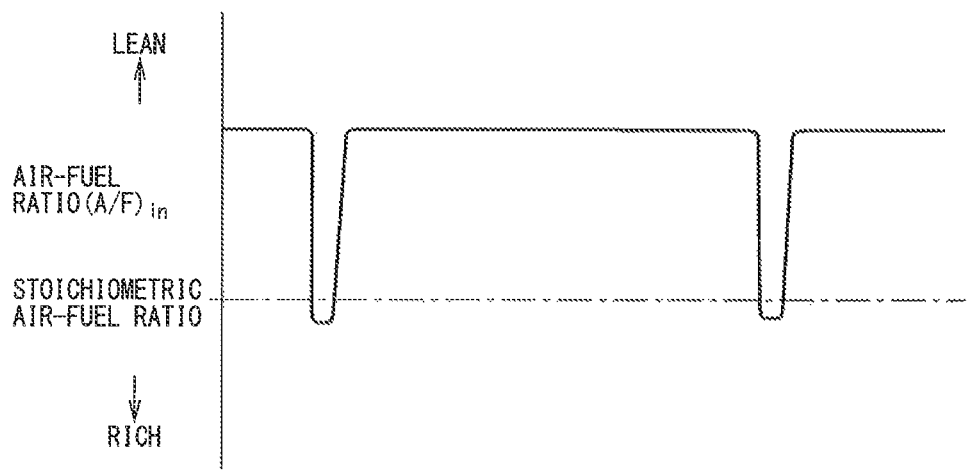
FIG. 8 is a view which shows a change of an air-fuel ratio of exhaust gas which flows into an exhaust purification catalyst.

FIG. 8 shows a case where an air-fuel ratio (A/F) in of the exhaust gas which flows into the basic layer 53 exhaust purification catalyst 13 temporarily rich slightly before an $NO_X$ absorption ability becomes saturated. Note that, in the example which is shown in FIG. 8, a time interval of this rich control is 1 minute or more. In this case, the $NO_X$ which is stored in the basic layer 53 when the air-fuel ratio (A/F) in of the exhaust gas is lean is released all at once from the basic layer 53 and reduced when the air-fuel ratio (A/F) in of the exhaust gas is temporarily made rich. Therefore, in this case, the basic layer 53 performs the role of an absorbent for temporarily absorbing $NO_X$.

Note that, at this time, sometimes the basic layer 53 temporarily adsorbs the $NO_X$. Therefore, if using the term of "storage" as a term including both absorption and adsorption, at this time, the basic layer 53 performs the role of an $NO_X$ storage agent for temporarily storing $NO_X$. That is, in this case, if referring to a ratio of an air and fuel (hydrocarbons) which are fed to the engine intake passage, combustion chamber 2, and exhaust passage upstream of the exhaust purification catalyst 13 as an "air-fuel ratio of the exhaust gas", the exhaust purification catalyst 13 functions as an $NO_X$ storage catalyst which stores $NO_X$ when the air-fuel ratio of the exhaust gas is lean and releases the stored $NO_X$ when a concentration of oxygen in the exhaust gas falls.

Figure 9:
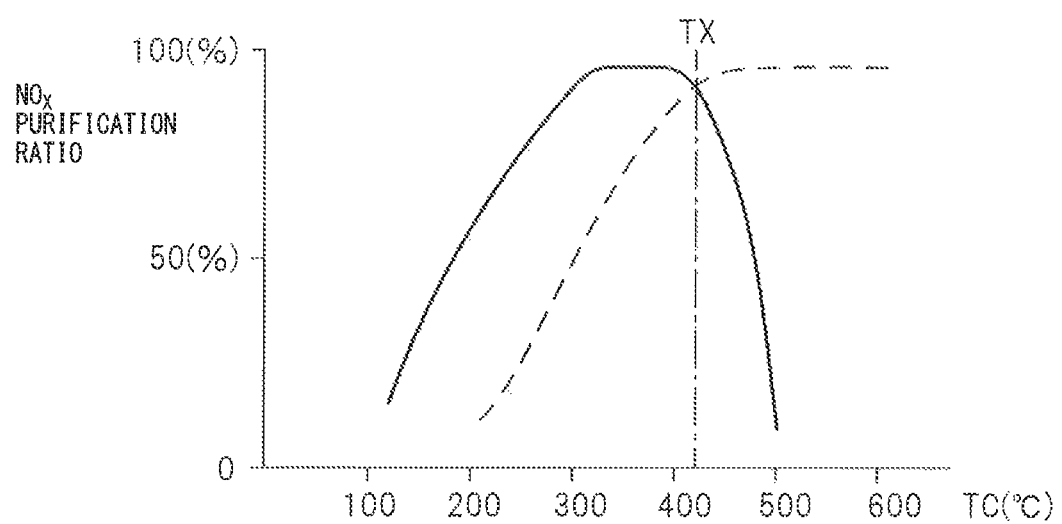
FIG. 9 is a view which shows an $NO_X$ purification ratio.

The solid line in FIG. 9 shows an $NO_X$ purification ratio when making the exhaust purification catalyst 13 function as an $NO_X$ storage catalyst in this way. Note that, in FIG. 9, the abscissa indicates the catalyst temperature TC of the exhaust purification catalyst 13. If making the exhaust purification catalyst 13 function as an $NO_X$ storage catalyst in this way, as shown in FIG. 9 by the solid line, an extremely high $NO_X$ purification ratio is obtained when the catalyst temperature TC is from 300° C. to 400° C., but the $NO_X$ purification ratio falls if the catalyst temperature TC is a high temperature of 400° C. or more. Note that FIG. 9 shows the $NO_X$ purification ratio which is shown in FIG. 5 by a broken line.

The reason why the $NO_X$ purification ratio falls in this way if the catalyst temperature TC becomes 400° C. or more is that, if the catalyst temperature TC becomes 400° C. or more, the nitrates are thermally decomposed and are released in the form of $NO_2$ from the exhaust purification catalyst 13. That is, so long as storing an $NO_X$ in the form of nitrates, it is difficult to obtain a high $NO_X$ purification ratio when the catalyst temperature TC is high. However, in the new $NO_X$ purification method which is shown from FIG. 4 to FIG. 6B, nitrates are not produced or even if produced are very small in amount, as will be understood from FIGS. 6A and 6B. Therefore, as shown in FIG. 5, even when the catalyst temperature TC is high, a high $NO_X$ purification ratio is obtained.

In the embodiment according to the present invention, to enable this new $NO_X$ purification method to be used to purify an $NO_x$, a hydrocarbon feed valve 15 for feeding hydrocarbons is arranged in the engine exhaust passage, an exhaust purification catalyst 13 is arranged downstream of the hydrocarbon feed valve 15 in the engine exhaust passage, a precious metal catalyst 51 is carried on an exhaust gas flow surface of the exhaust purification catalyst 13 and a basic exhaust gas flow surface part 54 is formed around the precious metal catalyst 51, the exhaust purification catalyst 13 has the property of reducing $NO_X$ which is contained in exhaust gas if a concentration of hydrocarbons which flow into the exhaust purification catalyst 13 is made to vibrate at an amplitude within a predetermined range of amplitude and with a period within a predetermined range of period and has the property of a storage amount of $NO_X$ which is contained in exhaust gas increasing if a vibration period of the hydrocarbon concentration is made longer than this predetermined range of period, and hydrocarbons are injected from the hydrocarbon feed valve 15 with a period within the predetermined range of period at the time of engine operation to thereby reduce the $NO_x$ which is contained in the exhaust gas at the exhaust purification catalyst 13.

That is, the $NO_X$ purification method which is shown from FIG. 4 to FIG. 6B can be said to be a new $NO_X$ purification method which is designed to purify $NO_X$ without forming almost any nitrates at all when using an exhaust purification catalyst in which a precious metal catalyst is carried and a basic layer which can absorb $NO_X$ is formed. In actuality, an amount of nitrates which are detected from the basic layer 53 is extremely small when using this new $NO_X$ purification method, compared with when making the exhaust purification catalyst 13 function as an $NO_X$ storage catalyst. Note that this new $NO_X$ purification method will be referred to as a first $NO_X$ purification method, hereinafter.

Figure 10:
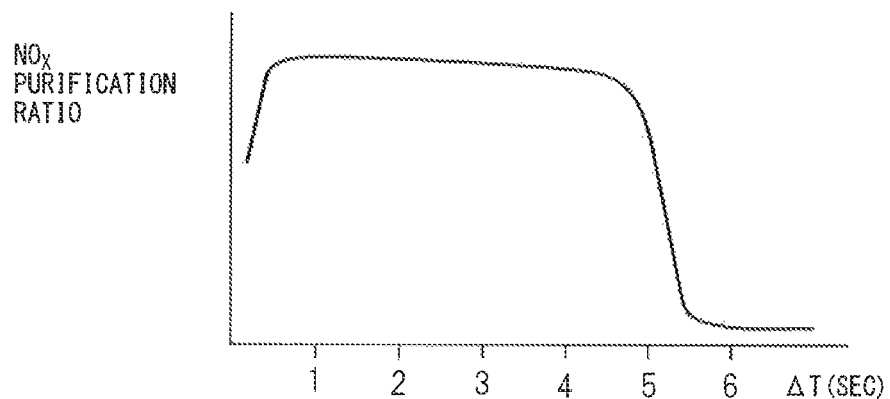
FIG. 10 is a view which shows a relationship between an injection period $\Delta T$ of hydrocarbons and an $NO_X$ purification ratio.

Now, as explained above, if the injection period ΔT of the hydrocarbon from the hydrocarbon feed valve 15 is longer, a time period where the oxygen concentration around the active $NO_X$* is higher becomes longer, in a time period from when the hydrocarbons are injected to when the hydrocarbons are next injected. In this case, in the embodiment which is shown in FIG. 1, if the injection period ΔT of the hydrocarbons becomes longer than about 5 seconds, the active $NO_X$* starts to be absorbed in the form of nitrates inside the basic layer 53. Therefore, as shown in FIG. 10, if the injection period ΔT of the hydrocarbons becomes longer than about 5 seconds, the $NO_X$ purification ratio falls. Therefore, in the embodiment which is shown in FIG. 1, the injection period ΔT of the hydrocarbons has to be made 5 seconds or less.

On the other hand, in the embodiment according to the present invention, if the injection period ΔT of the hydrocarbons becomes about 0.3 second or less, the injected hydrocarbons start to deposit on the exhaust gas flow surface of the exhaust purification catalyst 13 and, therefore, as shown in FIG. 10, if the injection period ΔT of the hydrocarbons becomes about 0.3 second or less, the $NO_X$ purification ratio falls. Therefore, in the embodiment according to the present invention, the injection period of the hydrocarbons is made from 0.3 second to 5 seconds.

Figure 11:
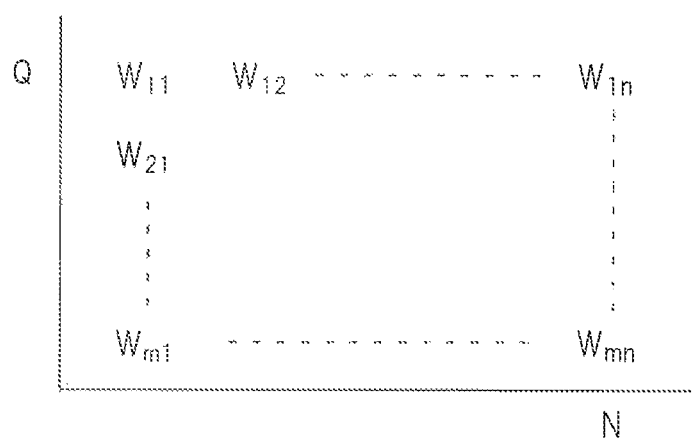
FIG. 11 is a map which shows an amount of injection of hydrocarbons.

Now, in the embodiment according to the present invention, a hydrocarbon injection amount and injection timing from the hydrocarbon feed valve 15 are made to change to control the air-fuel ratio (A/F) in of the exhaust gas which flows into the exhaust purification catalyst 13 and injection period ΔT to be optimum values corresponding to an operating state of the engine. In this case, in the embodiment according to the present invention, an optimum hydrocarbon injection amount W when the NOx purification action by the first NOx purification method is being performed is stored as a function of an amount of depression L of the accelerator pedal 40 and engine speed N in the form of a map such as shown in FIG. 11 in advance in the ROM 32. Further, an optimum injection period ΔT of the hydrocarbons at this time is also stored as a function of the amount of depression L of the accelerator pedal 40 and engine speed N in the form of a map in advance in the ROM 32.

Figure 12:
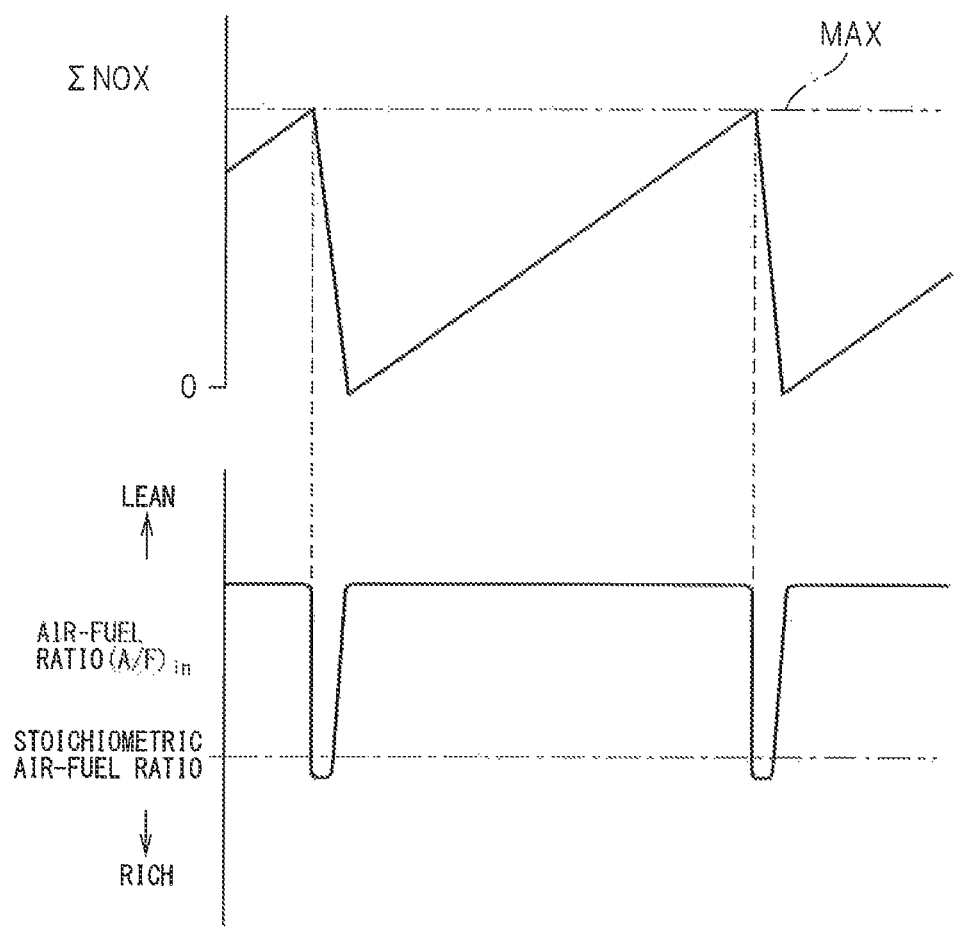
FIG. 12 is a view which shows $NO_X$ release control.

Next, referring to FIG. 12 to FIG. 15, the $NO_X$ purification method in a case of making the exhaust purification catalyst 13 function as an $NO_X$ storage catalyst will be specifically explained. The $NO_X$ purification method when making the exhaust purification catalyst 13 function as an $NO_X$ storage catalyst in this way will be referred to as a "second $NO_X$ purification method", hereinafter. In this second $NO_X$ purification method, as shown in FIG. 12, the air-fuel ratio (A/F) in of the exhaust gas which flows into the exhaust purification catalyst 13 is made temporarily rich when a stored $NO_X$ amount ΣNOX which is stored in the basic layer 53 exceeds a predetermined allowable amount MAX. If the air-fuel ratio (A/F) in of the exhaust gas is made rich, the $NO_X$ which was stored in the basic layer 53 when the air-fuel ratio (A/F) in of the exhaust gas was lean is released all at once from the basic layer 53 and reduced. Due to this, the $NO_X$ is purified.

Figure 13:
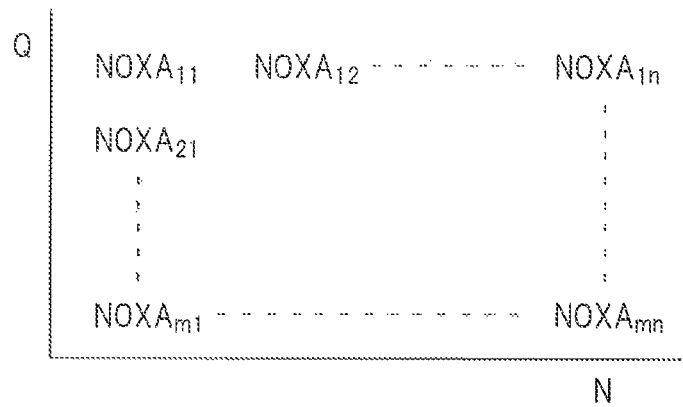
FIG. 13 is a map of a discharged $NO_X$ amount NOXA.

The stored $NO_X$ amount ΣNOX is calculated from, for example, an amount of $NO_X$ which is discharged from the engine. In the embodiment according to the present invention, a discharged $NO_X$ amount NOXA which is discharged from the engine per unit time is stored as a function of the amount of depression L of the accelerator pedal 40 and engine speed N in the form of a map such as shown in FIG. 13 in advance inside the ROM 32. This discharged $NO_X$ amount NOXA is used to calculate the stored $NO_X$ amount $\Sigma NOX$. In this case, as explained above, a period of making the air-fuel ratio (A/F) in of the exhaust gas rich is usually 1 minute or more.

Figure 14:
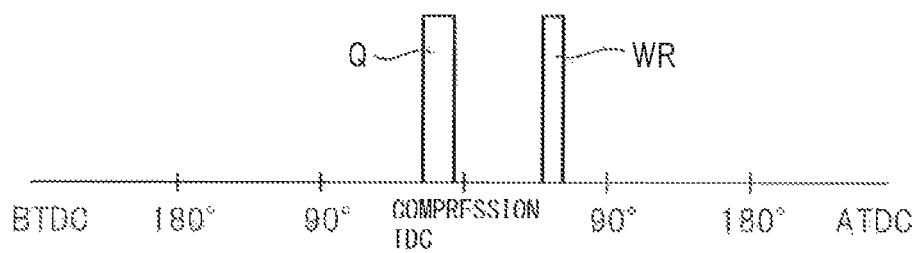
FIG. 14 is a view which shows a fuel injection timing.
Figure 15:
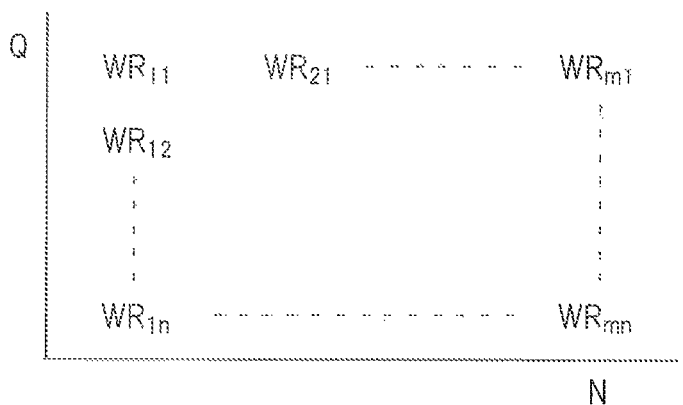
FIG. 15 is a view which shows a map of fuel feed amount WR.

In the second $NO_X$ purification method, as shown in FIG. 14, the air-fuel ratio (A/F) in of the exhaust gas which flows into the exhaust purification catalyst 13 is made rich by injecting not only fuel Q for combustion but also additional fuel WR into a combustion chamber 2 from a fuel injector 3. Note that, in FIG. 14, the abscissa shows a crank angle. This additional fuel WR is injected at a timing at which it will burn, but will not appear as engine output, that is, slightly before ATDC90° after compression top dead center. This fuel amount WR is stored as a function of the amount of depression L of the accelerator pedal 40 and the engine speed N in the form of a map such as shown in FIG. 15 in advance in the ROM 32. Of course, in this case, the air-fuel ratio (A/F) in of the exhaust gas can be made rich by increasing an injection amount of hydrocarbons from the hydrocarbon feed valve 15.

Now then, in the embodiment according to the present invention, an $NO_X$ purification action by the first $NO_X$ purification method and an $NO_X$ purification action by the second $NO_X$ purification method are selectively performed. Which of the $NO_X$ purification action by the first $NO_X$ purification method and the $NO_X$ purification action by the second $NO_X$ purification method to perform is for example determined as follows. That is, the $NO_X$ purification ratio when the $NO_X$ purification action by the first $NO_X$ purification method is performed, as shown in FIG. 9 by the broken line, starts to rapidly fall when the temperature TC of the exhaust purification catalyst 13 becomes the limit temperature TX or less. As opposed to this, as shown in FIG. 9 by the solid line, the $NO_X$ purification ratio when the $NO_X$ purification action by the second $NO_X$ purification method is performed falls relatively slowly when the temperature TC of the exhaust purification catalyst 13 falls. Therefore, in the embodiment according to the present invention, the $NO_X$ purification action by the first $NO_X$ purification method is performed when the temperature TC of the exhaust purification catalyst 13 is higher than the limit temperature TX, while the $NO_X$ purification action by the second $NO_X$ purification method is performed when the temperature TC of the exhaust purification catalyst 13 is lower than the limit temperature TX.

In this regard, the exhaust gas contains particulate matters which are mainly comprised of solid carbon. If exhaust gas flows in to the inside of the particulate filter 14, the particulate matters are trapped on the particulate filter 14. On the other hand, in the combustion chamber 2, the fuel is burned under an excess of oxygen. Therefore, so long as the fuel injector 3 and hydrocarbon feed valve 15 do not secondarily feed fuel, the particulate filter 14 is in an oxidizing atmosphere. Further, the particulate filter 14 carries a catalyst which has an oxidizing function. As a result, the particulate matters which are trapped at the particulate filter 14 is successively oxidized. In this regard, if an amount of particulate matters which are trapped per unit time becomes greater than an amount of particulate matters which are oxidized per unit time, the amount of particulate matters which are trapped on the particulate filter 14 increases along with the elapse of the engine operating time. As a result, a pressure loss of the particulate filter 14 becomes greater and a back pressure of the engine ends up becoming larger.

Therefore, in the embodiment according to the present invention, it is judged if the amount of particulate matters trapped on the particulate filter 14 is greater than an allowable upper limit amount. When it is judged that the amount of particulate matters trapped is greater than the allowable upper limit amount, temperature increasing control, which is configured to increase and maintain the temperature of the particulate filter 14 at a predetermined set temperature or more under a lean air-fuel ratio to remove the particulate matters from the particulate filter 14, is performed. This set temperature is a temperature enabling oxidation of the particulate matters and is, for example, 600° C. As a result, the particulate matters are oxidized and removed from the particulate filter 14. Note that, in the embodiment according to the present invention, it is judged that the amount of particulate matter trapped on the particulate filter 14 is greater than the allowable upper limit amount when a differential across the particulate filter 14 is higher than an allowable upper limit.

In the embodiment according to the present invention, to perform temperature increasing control, the hydrocarbon feed valve 15 injects hydrocarbons to make the air-fuel ratio of the exhaust gas which flows into the particulate filter 14 lean. That is, the injected hydrocarbons are burned at the exhaust purification catalyst 13, the temperature of the exhaust gas which flows into the particulate filter 14 increases, and, as a result, the temperature of the particulate filter 14 is increased. Alternatively, the injected hydrocarbons are burned at the particulate filter 14 and, as a result, the temperature of the particulate filter 14 is increased. Note that, in the embodiment according to the present invention, an air-fuel ratio of the exhaust gas which flows into the particulate filter 14 matches the air-fuel ratio (A/F) in of the exhaust gas which flows into the exhaust purification catalyst 13.

Further, in the temperature increasing control of the embodiment according to the present invention, a target temperature of the particulate filter 14 is set to a temperature equal to or higher than the above-mentioned predetermined set temperature, and the hydrocarbon feed valve 15 feeds hydrocarbons to increase the temperature of the particulate filter 14 to the target temperature and maintain the temperature of the particulate filter 14 at the target temperature. This target temperature is for example set to 650° C. Note that the target temperature is higher than the limit temperature TX which is shown in FIG. 9.

Figure 16:
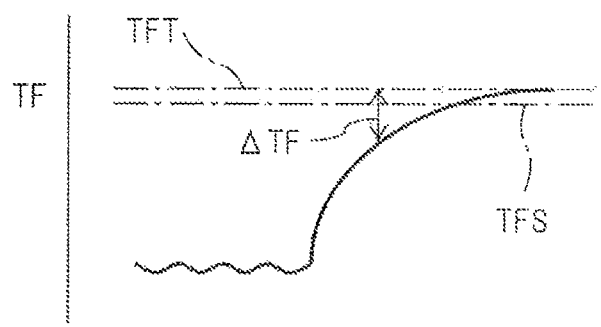
FIG. 16 is a time chart which shows changes of a temperature TC of an exhaust purification catalyst, a temperature TF of a particulate filter, and an air-fuel ratio (A/F) in of an exhaust gas.
Figure 17:
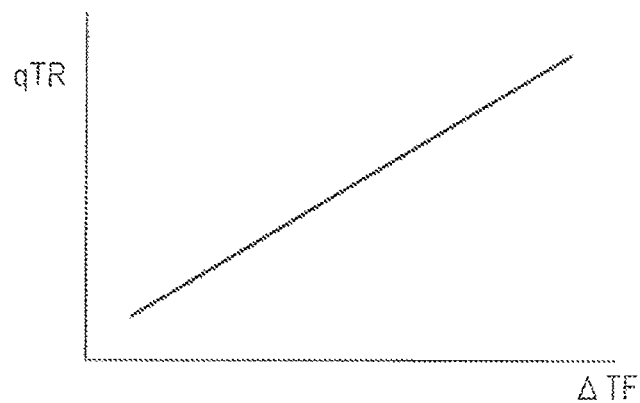
FIG. 17 is a time chart which explains a difference $\Delta$TF.

That is, as shown in FIG. 16, a difference $\Delta TF$ (=TFT−TF) of an actual temperature TF of the particulate filter 14 from a target temperature TFT is calculated. Next, an injection pressure PHCTR for temperature increasing control is set based on the difference $\Delta TF$. Specifically, as shown in FIG. 17, an amount qHC of hydrocarbons per one injection of hydrocarbons for increasing temperature control is set smaller as the difference $\Delta TF$ becomes smaller. As a result, the temperature TF of the particulate filter 14 is maintained at the target temperature TFT. This maintains an amount of hydrocarbons which is required for temperature increasing control small. Note that, in FIG. 16, TFS shows the above-mentioned predetermined set temperature.

Figure 18:
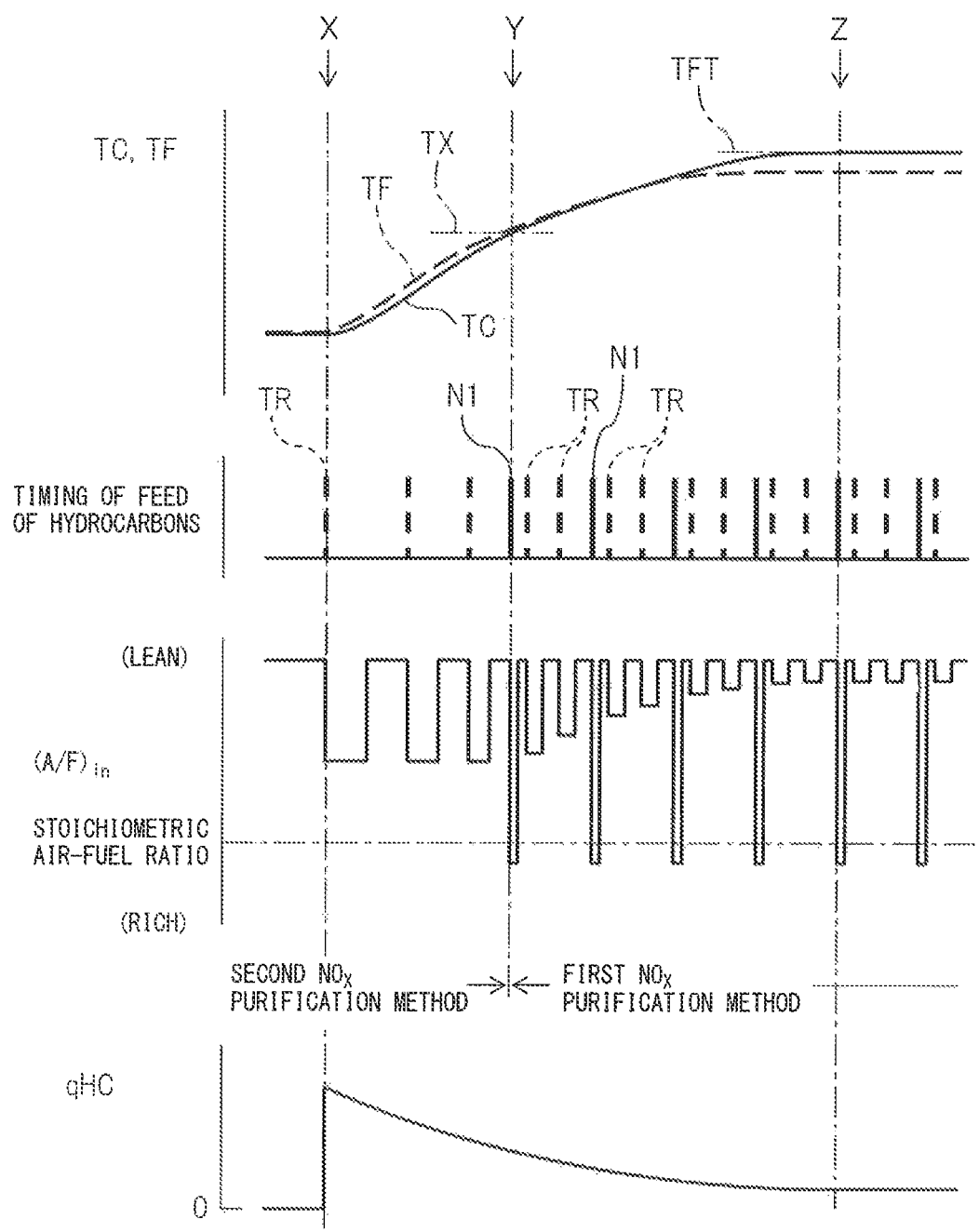
FIG. 18 is a view which shows a map of an injection amount qTR of the hydrocarbons for temperature increasing control.

Next, referring to FIG. 18, temperature increasing control of the embodiment according to the present invention will be explained in detail. FIG. 18 schematically shows changes along with time of the temperature TC of the exhaust purification catalyst 13, the temperature TF of the particulate filter 14, and the air-fuel ratio (A/F) in of the exhaust gas. In FIG. 18, an arrow X shows a timing at which a signal for performing temperature increasing control is issued. In the example which is shown in FIG. 18, when a signal for performing temperature increasing control is issued, the temperature TC of the exhaust purification catalyst 13 is lower than the limit temperature TX. Therefore, at this time, the second $NO_X$ purification method is performed. When the temperature increasing control should be performed while performing the second $NO_X$ purification method, injection of hydrocarbons for the temperature increasing control is performed as shown in FIG. 18 by arrows TR. As a result, the temperature TC of the exhaust purification catalyst 13 and the temperature TF of the particulate filter 14 increases. Note that, as explained above, the time interval of the rich control for making the air-fuel ratio (A/F) in of the exhaust gas temporarily rich to make the exhaust purification catalyst 13 release $NO_X$ is 1 minute or more and is relatively long. For this reason, in the example which is shown in FIG. 18, the change in the air-fuel ratio (A/F) in of the exhaust gas due to rich control is not shown.

Next, as shown in FIG. 18 by an arrow Y, if the temperature TC of the exhaust purification catalyst 13 exceeds the limit temperature TX, the second $NO_X$ purification method is ended and the first $NO_X$ purification method is started. That is, as shown in FIG. 18 by N1, injection of hydrocarbons for the first $NO_X$ purification method is performed with the above-mentioned period $\Delta T$. In this case, injection of hydrocarbons is performed to make the air-fuel ratio (A/F) in of the exhaust gas rich. Further, during the time period when injection of hydrocarbons for the first $NO_X$ purification method is not performed, that is, the time period from the previous injection of hydrocarbons for the first $NO_X$ purification method to the next injection of hydrocarbons for the first $NO_X$ purification method, injection of hydrocarbons for temperature increasing control is performed as shown in FIG. 18 by TR. In this case, injection of hydrocarbons is performed to maintain the air-fuel ratio (A/F) in of the exhaust gas lean. As a result, it is possible to perform good temperature increasing control while purifying $NO_X$ well.

Next, the temperature TF of the particulate filter 14 is increased to the target temperature TFT as shown in FIG. 18 by an arrow Z, and is maintained at the target temperature TFT.

In the temperature increasing control of the embodiment according to the present invention, the hydrocarbon injection amount qHC is set based on the difference $\Delta TF$, as explained above. That is, as shown in FIG. 18, as the difference $\Delta TF$ becomes smaller, that is, as the temperature TF of the particulate filter 14 approaches the target temperature TFT, the hydrocarbon injection amount qHC is decreased. Note that, when the temperature TF of the particulate filter 14 is increased to the target temperature TFT, the injection of hydrocarbons for temperature increasing control may be stopped.

The hydrocarbon injector 15 of the embodiment according to the present invention can change injection pressure and injection time. In the example which is shown in FIG. 18, when temperature increasing control should be performed without performing the first $NO_X$ purification method, that is, when the temperature increasing control should be performed while performing the second $NO_X$ purification method, the amount qHC of injection of hydrocarbons is controlled by maintaining the injection pressure at a relatively high constant pressure while controlling the injection time. According to this, it is possible to feed a large amount of hydrocarbons from the hydrocarbon injector 15 and possible to make the temperature TF of the particulate filter 14 quickly increase. As opposed to this, when the temperature increasing control should be performed while performing the first $NO_X$ purification method, the hydrocarbon injection amount qHC is controlled by maintaining the injection time constant while controlling the injection pressure. According to this, the injected hydrocarbons diffuse well in a radial direction of the exhaust purification catalyst 13 or particulate filter 14. As a result, it is possible to suppress the temperature of the particulate filter 14 from becoming uneven. Further, it is possible to suppress the temperature of the particulate filter 14 from pulsating. Therefore, it is possible to perform the good temperature increasing control.

On the other hand, the injection of hydrocarbons for the first $NO_X$ purification method is performed under a higher injection pressure compared with the injection of hydrocarbons for temperature increasing control. According to this, the concentration of hydrocarbons which flow into the exhaust purification catalyst 13 can be made to vibrate better. Therefore, $NO_X$ can be purified better. That is, when the temperature increasing control should be performed while performing the first $NO_X$ purification method, it is possible to purify $NO_X$ better while performing good temperature increasing control.

In the embodiment according to the present invention, further, the hydrocarbon injection time for the first $NO_X$ purification method is set shorter than the hydrocarbon injection time for temperature increasing control. As a result, the concentration of hydrocarbons which flow into the exhaust purification catalyst 13 can be made to vibrate better and therefore $NO_X$ can be purified better. Viewed conversely, the hydrocarbon injection time for temperature increasing control is set longer than the hydrocarbon injection time for the first $NO_X$ purification method. As a result, it is possible to suppress the temperature of the particulate filter 14 from becoming uneven more reliably and possible to suppress the temperature of the particulate filter 14 from pulsating more reliably, therefore it is possible to perform the temperature increasing control better.

Figure 19:
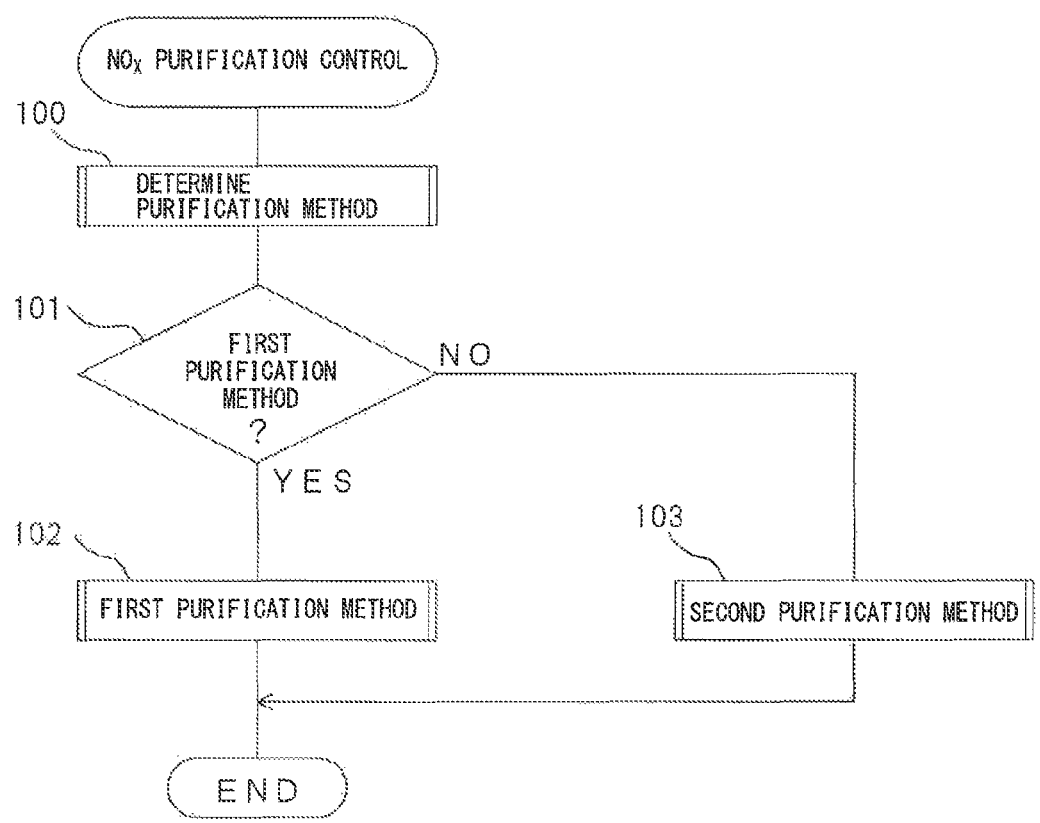
FIG. 19 is a flow chart for performing $NO_X$ purification control.
Figure 20:
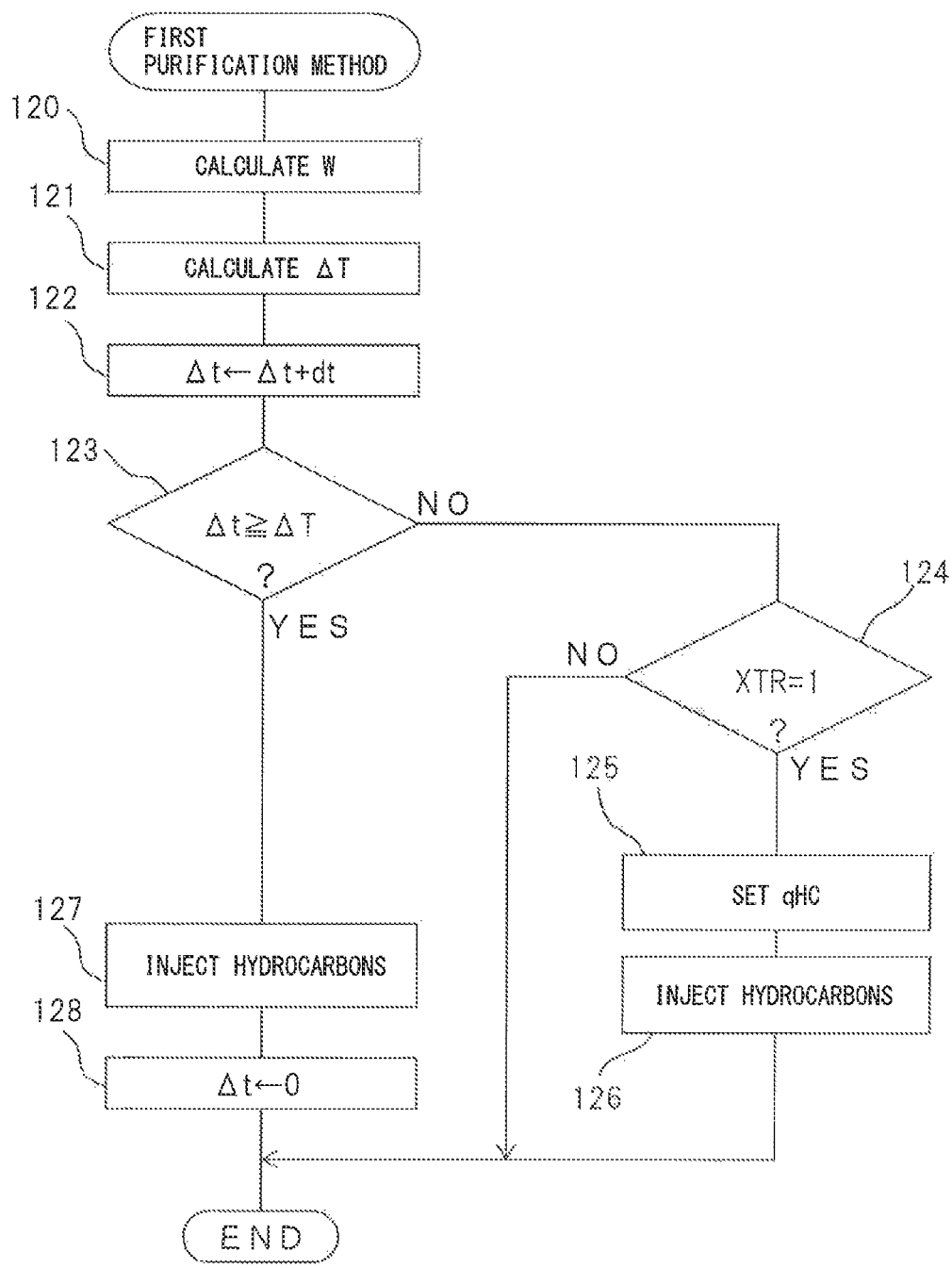
FIG. 20 is a flow chart for performing a first $NO_X$ purification method.

FIG. 19 shows a routine for performing the $NO_X$ purification control of the embodiment according to the present invention. This routine is performed by interruption every predetermined constant time. Referring to FIG. 19, at step 100, it is decided which of the $NO_X$ purification action by the first $NO_X$ purification method and the $NO_X$ purification action by the second $NO_X$ purification method to perform. Next, at step 101, it is judged whether the $NO_X$ purification action by the first $NO_X$ purification method should be performed. If the $NO_X$ purification action by the first $NO_X$ purification method should be performed, the routine proceeds to step 102 where a routine for performing the first $NO_X$ purification method is performed. This routine is shown in FIG. 20. If, at step 101, the $NO_X$ purification action by the second $NO_X$ purification method should be performed, next the routine proceeds to step 103 where a routine for performing the second $NO_X$ purification method is performed. This routine is shown in FIG. 21.

FIG. 20 shows the routine for performing the first $NO_X$ purification method. Referring to FIG. 20, at step 120, the injection amount W is calculated from FIG. 11. At the next step 121, the injection period $\Delta T$ is calculated in accordance with the engine operating state. At the next step 122, an elapsed time $\Delta t$ from the previous injection of hydrocarbons for the first $NO_X$ purification method is increased by a constant value dt ($\Delta t=\Delta t+dt$). At the next step 123, it is judged if the elapsed time $\Delta t$ is the injection period $\Delta T$ or more. If $\Delta t<\Delta T$, the routine proceeds to step 124 where it is judged if a flag XTR is set. This flag XTR is set (XTR=1) if the temperature increasing control should be performed and is reset (XTR=0) otherwise. If the flag XTR is not set, that is, if temperature increasing control should not be performed, the processing cycle is ended. If the flag XTR is set, that is, if temperature increasing control should be performed, next the routine proceeds to step 125 where the map of FIG. 18 is used to set the amount qHC of injection of hydrocarbons for temperature increasing control. At the next step 125, the hydrocarbon feed valve 15 injects hydrocarbons by qHC whereby injection of hydrocarbons for temperature increasing control is performed.

If, at step 123, $\Delta t \geq \Delta T$, next the routine proceeds to step 127 where the hydrocarbon feed valve 15 injects hydrocarbons by W, therefore injection of hydrocarbons for the first NOx purification method is performed. At the next step 128, the elapsed time $\Delta t$ is reset ($\Delta t=0$).

Figure 21:
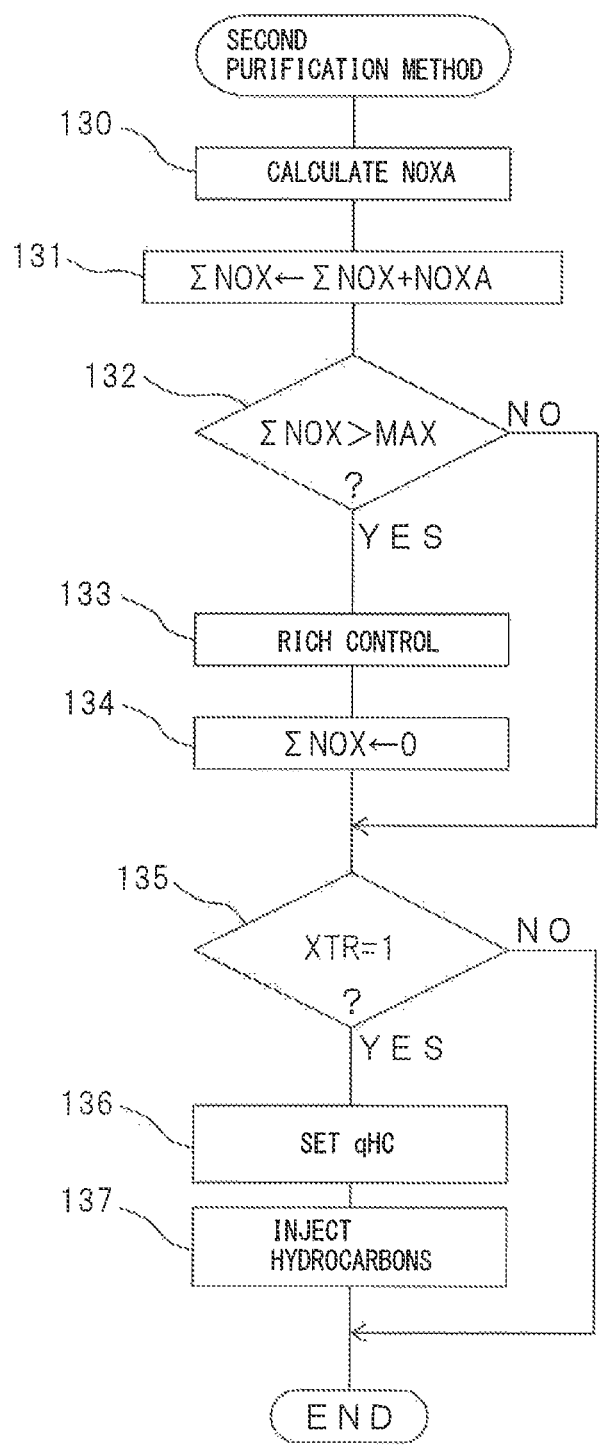
FIG. 21 is a flow chart for performing a second $NO_X$ purification method.

FIG. 21 shows the routine for performing the second $NO_X$ purification method. Referring to FIG. 21, at step 130, the amount NOXA of $NO_X$ discharged per unit time is calculated from the map which is shown in FIG. 13. Next, at step 131, ΣNOX is increased by the discharged $NO_X$ amount NOXA to thereby calculate the stored $NO_X$ amount ΣNOX (ΣNOX=ΣNOX+NOXA). Next, at the step 132, it is judged if the stored $NO_X$ amount ΣNOX has exceeded the allowable value MAX. If ΣNOX≤MAX, the routine jumps to step 135. If ΣNOX>MAX, the routine proceeds to step 133 where the amount WR of additional fuel is calculated from the map which is shown in FIG. 15 and the action of injecting additional fuel is performed. At this time, the air-fuel ratio (A/F) in of the exhaust gas which flows into the exhaust purification catalyst 13 is made rich. Next, at step 134, ΣNOX is cleared. Next, the routine proceeds to step 135.

At step 135, it is judged if the flag XTR which is set when temperature increasing control should be performed has been set. If the flag XTR has not been set, that is, if temperature increasing control should be performed, the processing cycle is ended. If the flag XTR is set, that is, if temperature increasing control should be performed, next the routine proceeds to step 136 where the map of FIG. 18 is used to set the amount of the amount qHC of injection of hydrocarbons for temperature increasing control. At the next step 137, the hydrocarbon feed valve 15 injects the hydrocarbons by qHC, therefore injection of hydrocarbons for temperature increasing control is performed.

Figure 22:
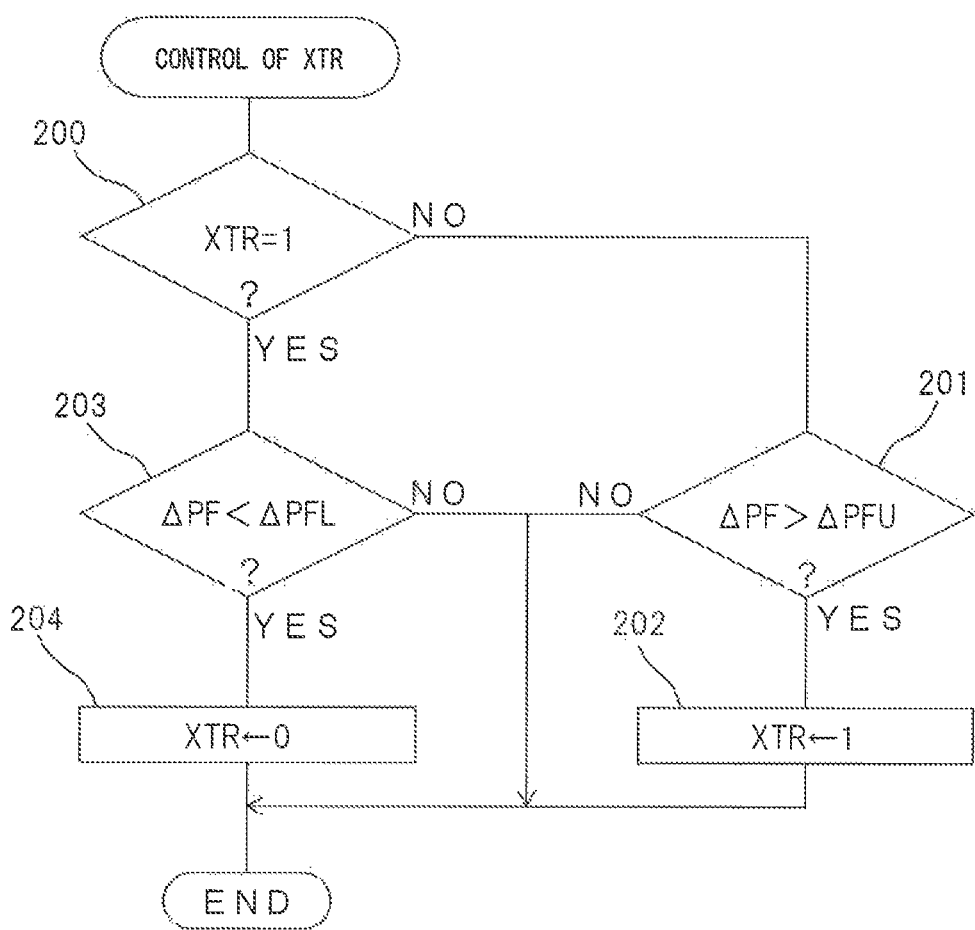
FIG. 22 is a flow chart for performing control of a flag XTR.

FIG. 22 shows a routine for control of the flag XTR. This routine is performed by interruption every predetermined constant time. Referring to FIG. 22, at step 200, it is judged if the flag XTR is set. If the flag XTR is reset, next the routine proceeds to step 201 where it is judged if the differential pressure ΔPF across the particulate filter 14 is larger than the allowable upper limit ΔPFU. If ΔPF≤ΔPFU, the processing cycle is ended. If ΔPF>ΔPFU, next, the routine proceeds to step 202 where the flag XTR is set. Therefore, temperature increasing control is performed. Once the flag XTR is set, the routine proceeds from step 200 to step 203 where it is judged if the differential pressure ΔPF across the particulate filter 14 is smaller than the lower limit ΔPFL. If ΔPF>ΔPFL, the processing cycle is ended. If ΔPF>ΔPFL, next, the routine proceeds to step 204 where the flag XTR is reset. Therefore, the temperature raising control is ended.

Note that, as another embodiment, it is also possible to arrange an oxidation catalyst for reforming hydrocarbons upstream of the exhaust purification catalyst 13 inside of the engine exhaust passage.

In the embodiment according to the present invention explained up to here, the difference ΔTF of the actual temperature TF of the particulate filter 14 from the target temperature TFT is calculated, and the amount of injection of hydrocarbons for temperature increasing control is set smaller as the difference ΔTF becomes smaller. In this case, if the target temperature TFT is made constant, the actual temperature TF of the particulate filter 14 shows the difference ΔTF. Therefore, in another embodiment according to the present invention, the amount of injection of hydrocarbons for temperature increasing control is set larger as the actual temperature TF of the particulate filter 14 becomes lower. According to this, the difference ΔTF does not have to be calculated.

Therefore, comprehensively speaking, an amount of injection of hydrocarbons for temperature increasing control when an actual temperature TF of the particulate filter 14 is low is set larger than that when the actual temperature TF of the particulate filter 14 is high.

REFERENCE SIGNS LIST 4. intake manifold
5. exhaust manifold
12a, 12b. exhaust pipe
13. exhaust purification catalyst
14. particulate filter
15. hydrocarbon feed valve

The invention claimed is:
1. An exhaust purification system for an internal combustion engine, comprising:
an exhaust purification catalyst arranged in an engine exhaust passage;
a hydrocarbon feed valve arranged upstream of the exhaust purification catalyst in the engine exhaust passage;
a precious metal catalyst carried on an exhaust gas flow surface of the exhaust purification catalyst;
basic exhaust gas flow surface parts formed around the precious metal catalyst,
wherein the exhaust purification catalyst has a property of reducing $NO_X$ contained in exhaust gas when a concentration of hydrocarbons flowing into the exhaust purification catalyst is caused to vibrate at an amplitude within a predetermined range of amplitude and with a period within a predetermined range of period, the exhaust purification catalyst having a property of increasing a storage amount of $NO_X$ contained in exhaust gas when a vibration period of the hydrocarbon concentration is made longer than the predetermined range of period;
a particulate filter arranged in the engine exhaust passage, for trapping particulate matters in the exhaust gas; and
an electronic control unit configured to control purification of $NO_X$ contained in the exhaust gas, wherein the electronic control unit is configured to:
inject hydrocarbons from the hydrocarbon feed valve with a period within the predetermined range of period to perform a first NOx purification control,
inject hydrocarbons from the hydrocarbon feed valve to perform a temperature increasing control of the particulate filter,
determine whether the temperature increasing control of the particulate filter should be performed when the first NOx purification control is being performed,
when the electronic control unit determines that temperature increasing control of the particulate filter should be performed when the first $NO_X$ purification control is being performed, inject hydrocarbons for the first $NO_X$ purification control with the period within the predetermined range of period and inject hydrocarbons to perform the temperature increasing control during performance of the first NOx purification control when hydrocarbons for the first $NO_X$ purification control are not being injected, perform the temperature increasing control to increase a temperature of the particulate filter to remove particulate matters trapped on the particulate filter, and inject a smaller amount of hydrocarbons per one injection of hydrocarbons when performing the temperature increasing control as an actual temperature of the particulate filter becomes higher, and inject a greater amount of hydrocarbons per one injection of hydrocarbons when performing the temperature increasing control as the actual temperature of the particulate filter becomes lower.

2. The exhaust purification system for an internal combustion engine according to claim 1, wherein, in the temperature increasing control, the electronic control unit is configured to increase the temperature of the particulate filter to a target temperature and maintain the temperature of the particulate filter at the target temperature and set the amount of hydrocarbons per one injection of hydrocarbons for temperature increasing control to be smaller as a difference between the actual temperature of the particulate filter and the target temperature becomes smaller.

3. The exhaust purification system for an internal combustion engine according to claim 1, wherein the electronic control unit is configured to inject hydrocarbons during the first $NO_X$ purification control to make an air-fuel ratio of exhaust gas which flows into the exhaust purification catalyst rich.

4. The exhaust purification system for an internal combustion engine according to claim 1, wherein the electronic control unit is configured to inject hydrocarbons during the temperature increasing control to make an air-fuel ratio of exhaust gas which flows into the particulate filter lean.

5. The exhaust purification system for an internal combustion engine according to claim 1, wherein the electronic control unit is configured to selectively perform the first $NO_X$ purification control and a second $NO_X$ purification control, the electronic control unit is configured to perform the second $NO_X$ purification control to release stored $NO_X$ from the exhaust purification catalyst and purify the $NO_X$ by making an air-fuel ratio of exhaust gas which flows into the exhaust purification catalyst rich with a period longer than the predetermined range of period.

6. The exhaust purification system for an internal combustion engine according to claim 5, wherein the electronic control unit is configured to perform the second $NO_X$ purification when a temperature of the exhaust purification catalyst is lower than a limit temperature, and perform the first $NO_X$ purification method when the temperature of the exhaust purification catalyst is higher than the limit temperature.

* * * * *